(12) United States Patent
Uhlemann

(10) Patent No.: US 8,144,861 B2
(45) Date of Patent: Mar. 27, 2012

(54) COMMUNICATION CIRCUITRY, DEVICES AND METHODS

(75) Inventor: Stefan Uhlemann, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1435 days.

(21) Appl. No.: 11/644,387

(22) Filed: Dec. 20, 2006

(65) Prior Publication Data

US 2008/0151929 A1 Jun. 26, 2008

(51) Int. Cl.
*H04M 1/00* (2006.01)
(52) U.S. Cl. .............. 379/404; 379/390.04; 379/413.02; 379/413.04; 379/398; 381/98
(58) Field of Classification Search . 379/399.01–413.04
See application file for complete search history.

(56) References Cited

U.S. PATENT DOCUMENTS

| | | | |
|---|---|---|---|
| 6,477,249 B1 | 11/2002 | Williamson et al. | |
| 6,577,249 B1 * | 6/2003 | Akatsuka et al. | 340/988 |
| 6,711,260 B1 * | 3/2004 | Russell et al. | 379/399.01 |
| 7,390,960 B1 * | 6/2008 | Arnold | 84/735 |
| 2003/0076946 A1 * | 4/2003 | Dziawa et al. | 379/398 |
| 2005/0185667 A1 * | 8/2005 | Uhlemann | 370/463 |

FOREIGN PATENT DOCUMENTS

| | | |
|---|---|---|
| DE | 102004002694 | 8/2005 |
| DE | 102004032206 | 1/2006 |
| JP | 2006025103 | 1/2006 |

OTHER PUBLICATIONS

Converge! Network Digest, "Ikanos Unveils Multi-Mode DSL—VDSL2, VDSL, ADSL2+, and ADSL," Silicon News, pp. 1 (Nov. 15, 2005). <http://www.convergedigest.com/Silicon/siliconarticle.asp>.

* cited by examiner

*Primary Examiner* — Fan Tsang
*Assistant Examiner* — Ibraham Sharifzada
(74) *Attorney, Agent, or Firm* — Dicke, Billig & Czaja, PLLC

(57) ABSTRACT

A method of signal communication includes receiving a selection signal, and selecting a selected frequency range used for a multi-carrier signal communication from a set of predetermined frequency ranges for signal communication depending on the selection signal. The set of predetermined frequency ranges includes a first frequency range and a second frequency range including the first frequency range.

33 Claims, 3 Drawing Sheets

COMMUNICATION CIRCUITRY, DEVICES AND METHODS

BACKGROUND

Digital subscriber line (DSL) communication is used in a variety of situations at a variety of frequency ranges or bandwidths.

For example, DSL communication between a central office and an end user typically takes place over copper lines. These copper lines can be used simultaneously for analog telephony and DSL communication. One such analog telephony is plain old telephone system (POTS).

Many modern systems now use integrated services digital network (ISDN) communication. ISDN uses a broader frequency range than POTS. When DSL is used together with ISDN, DSL typically uses a frequency range above 138 kHz for communication. In contrast, when DSL is used together with POTS, DSL uses a frequency range of above about 25 kHz.

In another situation, DSL is used without any further services. In this situation, DSL may typically use the whole available bandwidth, as in this situation, voice communication and data communication are typically handled via the same service. In all of these situations, the upper boundary of the DSL frequency range is dependent on the DSL standard used.

For these and other reasons there is a need for the present invention.

SUMMARY

One embodiment provides a method of signal communication. The method includes receiving a selection signal. The method includes selecting a selected frequency range used for a multi-carrier signal communication from a set of predetermined frequency ranges for signal communication depending on the selection signal. The set of predetermined frequency ranges includes a first frequency range and a second frequency range including the first frequency range.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments relate to communication circuitry, corresponding communication devices and methods for controlling such communication components or devices.

In the following, various embodiments are discussed with reference to the drawings. In particular, embodiments are capable of performing communication selectively in a first frequency range or a second frequency range are discussed. These embodiments comprise communication circuitry like integrated circuits or groups of integrated circuits, communication devices like linecards or central office equipment using such communication devices and may, for example, be employed for digital subscriber line (DSL) communication like asymmetric digital subscriber line (ADSL) or very high bit digital subscriber line (VDSL). However, embodiments are not limited to these applications.

Figure 1:
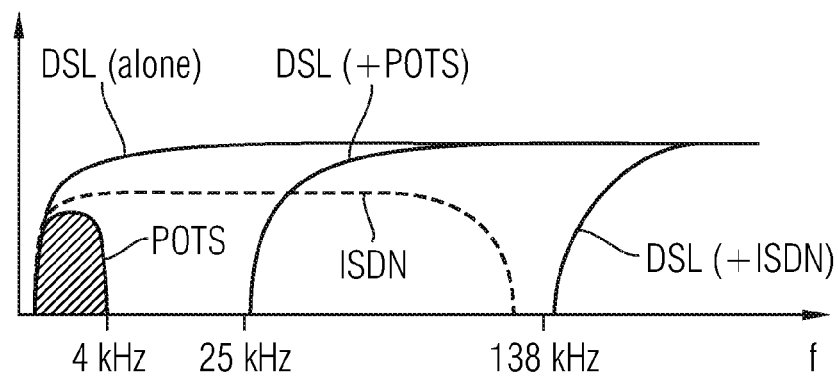
FIG. 1 is a diagram illustrating three frequency ranges used for various types of communication.

To explain the application of embodiments in the context of DSL communication further, FIG. 1 illustrates the frequency range or bandwidth used for DSL communication in three different situations.

In many cases DSL communication between a central office and an end user (e.g., private homes or a company) takes place over copper lines which have traditionally been used for analog telephony, also referred to as plain old telephone system (POTS). These copper lines in a first scenario may be used simultaneously for POTS and for DSL communication. In this case, for POTS a frequency range up to about 4 kHz is used, and DSL communication takes place in a frequency range above about 25 kHz, the upper boundary of the DSL frequency range being dependent on the DSL standard used.

While POTS is still in use for voice communication, in modern systems it has been very often replaced by integrated services digital network (ISDN) communication. ISDN occupies a broader frequency range than POTS up to about 138 kHz. In a second scenario, when DSL is used together with ISDN, DSL correspondingly uses a frequency range above 138 kHz for communication. In this case, voice communication like telephony is handled via ISDN, while data communication, for example for connection with the internet, is handled via DSL.

A third scenario also illustrated in FIG. 1 is the use of DSL without any further services, designated DSL (alone) in FIG. 1. In particular, in this case the DSL service may basically use the whole available bandwidth, and no separate voice service is available. This scenario is becoming more popular with the increased availability and quality of voice over IP, where voice communication is not handled via the traditional services like POTS or ISDN, but via a data communication network like the internet by sending voice data in the form of data packets. In other words, voice communication and data communication is handled via the same service.

In the former two cases (DSL with POTS or DSL with ISDN), splitters are used to separate the DSL signals from the POTS/ISDN signals, whereas for the latter case no splitter is necessary.

Embodiments described in the following provides a DSL linecard for a central office equipment which can be used in both cases. These two cases of the use of this embodiment will be explained further with reference to FIGS. 2 and 3.

Figure 2:
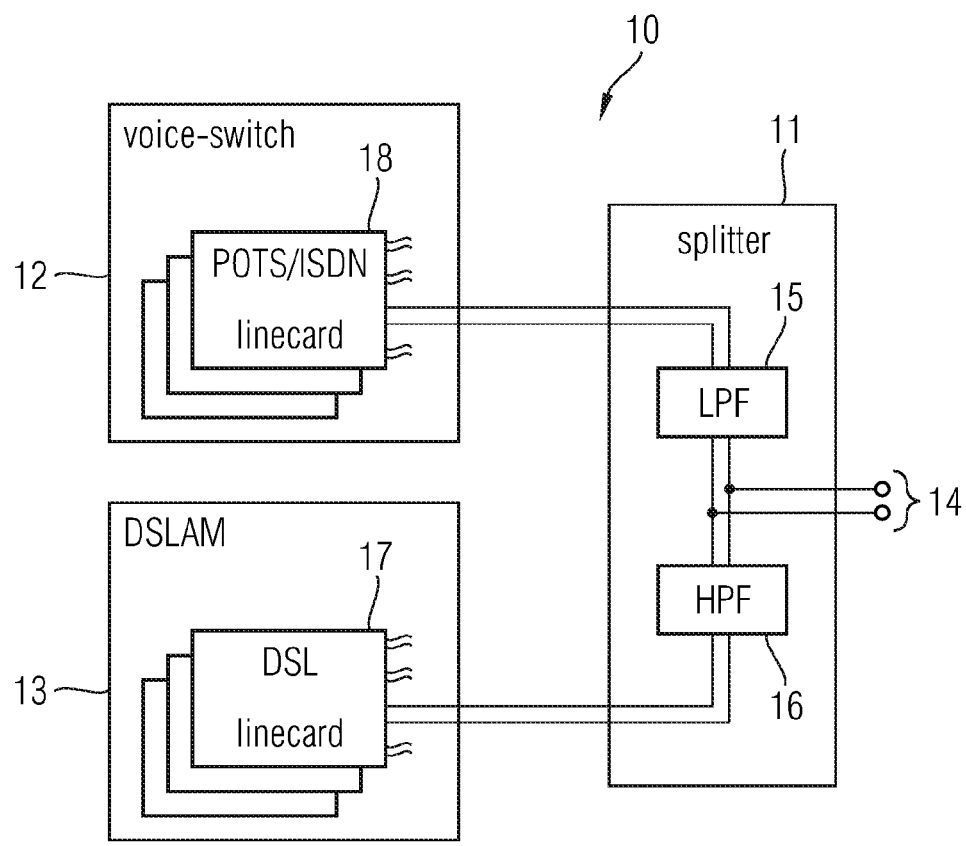
FIG. 2 is a diagram illustrating the use of a DSL linecard according to an embodiment in an environment with a splitter.

FIG. 2 illustrates the use of a DSL linecard 17 according to one embodiment in a central office equipment 10 in case both DSL and a voice service like POTS or ISDN are present on a subscriber line. Subscriber line, in this case designates a line leading to customers premises, for example to communication equipment in a private home or a company.

In the situation illustrated in FIG. 2, the subscriber line, which for example is formed by a pair of copper wires, is connected to a splitter 11 serving to separate the DSL signals from the POTS or ISDN signals. To achieve this, a low-pass filter 15 and a high-pass filter 16 are provided in splitter 11. High-pass filter 16 according to an embodiment may be a first order high-pass filter, whereas low-pass filter 15 may be a low-pass filter of higher order, for example a sixth order filter. However, in other embodiments, high-pass and low-pass filters may have other orders.

Low-pass filter 15 has a corner frequency to let the POTS or IDSN signal pass and to block the DSL signal, whereas high-pass filter 16 correspondingly has a corner frequency to let the DSL signal pass and to block the POTS or ISDN signal. The separation of the frequency band for POTS or ISDN and the frequency band for DSL performed in splitter 11 in some splitters is only a comparatively rough separation, in particular for the DSL signal if only a first order high-pass filter is used. In these cases, further filters may be employed in the elements connected to the splitter to further separate the signal and in particular to filter out parts of the respective undesired frequency range in case the filtering performed within splitter 11 needs further filtering.

In the structure illustrated in FIG. 2, a voice switch 12 is connected which comprises a plurality of POTS linecards 18 or ISDN linecards 18 (depending on the system used for voice communication) or combinations of POTS and ISDN linecards 18. One of these POTS/ISDN linecards 18 is connected with low-pass filter 15 of splitter 11. Further splitters connected with further subscriber lines may be connected to other POTS/ISDN linecards within voice switch 12 or to other connectors of POTS/ISDN linecard 18. In other words, one linecard may have the corresponding components to handle one or more voice connections, and a plurality of linecards may be present in voice switch 12. Voice switch 12 distributes voice signals received from a backbone network of the telecommunications provider (not illustrated) to the appropriate subscriber line and coalesces incoming signals from the subscriber line.

On the other hand, high-pass filter 16 of splitter 13 is connected with a digital subscriber line access multiplexer (DSLAM) 13 and in particular to DSL linecard 17 installed therein. Similar to voice switch 12, linecard 17 may have more connectors to be connected (via splitters or not) with a plurality of subscriber lines, and DSLAM 13 may comprise a plurality of linecards. According to an embodiment, DSLAM 13 may comprise one or more conventional linecards in addition to one or more linecards 17. Like voice switch 12 for voice signals, DSLAM 13 serves to coalesce DSL data signals received from subscriber line 14 and to forward the data to a backbone network and distribute data received from the backbone network to the appropriate subscriber line 14. Furthermore, while FIG. 2 illustrates high-pass filter 16 external to DSL linecard 17, high-pass filter 16 may according to an embodiment may be integrated on POTS/ISDN linecard 18.

Figure 3:
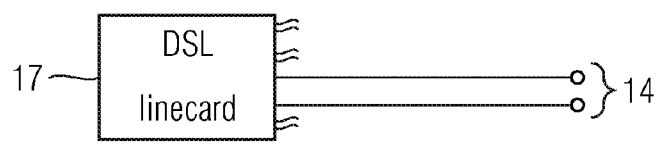
FIG. 3 is a diagram illustrating the use of a DSL linecard according to an embodiment in an environment without a splitter.

The second scenario of operation of the DSL linecard 17 according to one embodiment is illustrated schematically in FIG. 3. Here, no POTS or ISDN service is present, but subscriber line 14 is only used for DSL communication. Consequently, subscriber line 14 is directly connected with DSL linecard 17 without a splitter inbetween. Also, in the embodiment of FIG. 3, DSL linecard 17 may be located in a DSLAM which is not illustrated in FIG. 3 for simplification.

DSL linecard 17 of this embodiment may be used in both operation modes by switching the usage frequency range on the linecard (i.e., by changing the frequency range used for DSL communication depending on the environment (with or without splitter) of the linecard). An examplary implementation of DSL linecard 17 according to an embodiment is illustrated in FIG. 4.

Figure 4:
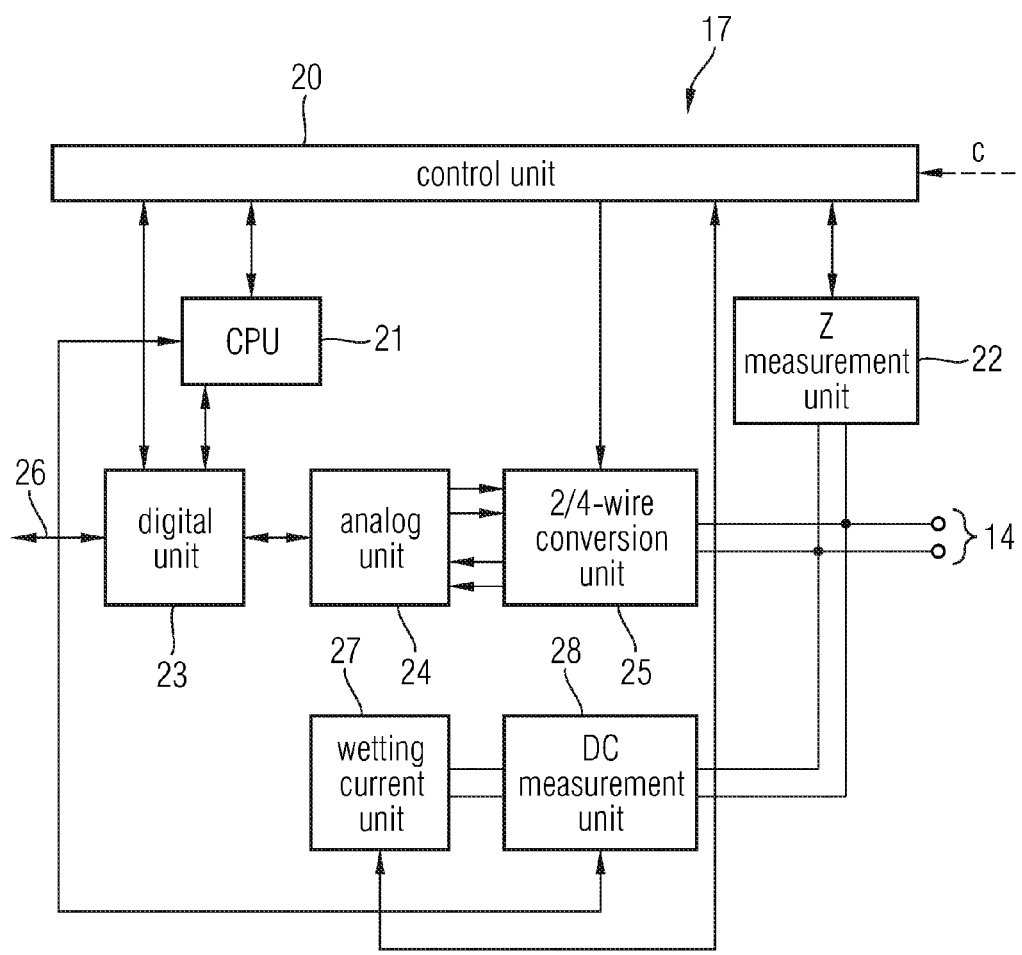
FIG. 4 is a block diagram illustrating a linecard according to an embodiment.

FIG. 4, in block diagram form, illustrates one embodiment of linecard 17 for the connection to one subscriber line 14. In the embodiment illustrated in FIG. 4, subscriber line 14 is connected to a 2 wire/4 wire conversion unit 25 which serves for 2 wire/4 wire conversion and vice versa, (i.e., which "splits up" the subscriber line 14 which serves both for sending and receiving data into separate lines for sending and receiving data) which, in FIG. 4, are represented as arrows on the left side of 2/4 wire conversion unit 25. 2/4 wire conversion unit 25 is coupled with an analog unit 24 followed by a digital unit 23. For data signals received from subscriber line 14, analog unit 24 performs an analog/digital conversion, possibly together with analog filtering, and forwards the signals to digital unit 23. In digital unit 23, further signal processing like digital filtering may be performed. The signals are then forwarded to a backbone network as indicated by arrow 26. Conversely, when data is received from backbone network, digital unit 23 performs digital filtering if necessary, analog unit 24 converts the digital data to analog data and forwards the analog signal to 2/4 wire conversion unit 25 to be sent over subscriber line 14. In the embodiment illustrated, 2/4 wire conversion unit 25 comprises a switchable high-pass filter, the function of which is described below.

The embodiment illustrated in FIG. 4 further comprises a control unit 20 for controlling the switching between operation with a splitter as illustrated in FIG. 2 and operation without a splitter as illustrated in FIG. 3. The necessary instructions for performing these tasks may be stored in a firmware memory associated with control unit 20. Control unit 20 is coupled with a Z measurement unit 22 for measuring an impedance Z of subscriber line 14. Furthermore, the embodiment illustrated comprises a central processing unit (CPU) 21 which controls the DSL communication via subscriber line 14 and in particular is responsible for establishing and terminating DSL connections via subscriber line 14.

In the following, an exemplary operation of the embodiment of FIG. 4 for switching between the situations of FIGS. 2 and 3 is explained.

When CPU 21 starts to establish a DSL connection via subscriber line 14 with a subscriber (which may be initiated by a request sent from the subscriber via subscriber line 14) it informs control unit 20. Control unit 20 then controls Z measurement unit 22 to perform impedance measurements on subscriber line 14 for determining whether a splitter is present, for example whether splitter 11 illustrated in FIG. 2 is presented. Possible measurement sequences for achieving this is explained in greater detail below. According to other embodiments, automatic detection whether a POTS/ISDN service is implemented may be achieved by testing for equipment other than splitters at the central office side or subscriber side or for configurations of equipment at the central office or subscriber side. For example, according to one embodiment, the presence of a POTS/ISDN linecard may be directly tested and reported to control unit 20.

When it is detected that a POTS or ISDN service is used, for example if the impedance measurements performed by Z measurement unit 24 yield the result that a splitter is present, control unit 20 sets 2/4 conversion unit 25 and digital unit 23 in a "combined mode" (i.e., a mode of operation for the parallel use of POTS or ISDN over subscriber line 14). In particular, an analog high-pass filter in 2/4 wire conversion unit 25 and/or digital high-pass filters in digital unit 23 are set to appropriate corner frequencies as illustrated in FIG. 1, for example a corner frequency of 138 kHz for use together with ISDN or a corner frequency of 25 KHz for use together with POTS. Furthermore, digital unit 23 is controlled to perform de-modulation of data only using carriers in the corresponding frequency range used for DSL, for example by using discrete multitone modulation as a modulation technique for DSL connections.

On the other hand, when it is detected that no POTS or ISDN service is implemented, for example if the impedance measurements yield the result that no splitter is present, control unit 20 controls 2/4 wire conversion 25 and digital unit 23 to operate in "single mode" (i.e., a mode where subscriber line 14 is used only for DSL). Then, high-pass filters, as mentioned above, are switched to a lower corner frequency (e.g., 25 kHz or 15 kHz) or even switched off completely in order to use the full available bandwidth for DSL transmission. The corner frequency used in single mode is, in embodiments, a predetermined constant. Correspondingly, digital unit 23 is controlled to use a correspondingly extended frequency range for de-modulation of data.

Alternatively or additionally to the switching between single mode and combined mode based on the measurements made by Z measurement unit 22, the switching can also be effected by sending a corresponding control signal c to control unit 20, for example for performing the mode switching based on an user input either remotely via data communication or directly at the central office side. In other words, embodiments may employ an automatic switching, for example using an impedance measurement, a manual switching, for example by control signal c, or both possibilities.

Furthermore, the embodiment illustrated comprises a wetting current unit coupled with subscriber line 14 via a DC measurement unit 28. Wetting current unit 27 is activated by control unit 20 in single mode. When activated, wetting current unit 27 applies a predetermined fixed voltage to subscriber line 14. Applying such a fixed voltage causes a "wetting current" to flow via subscriber line 14 which prevents or slows the corrosion of contacts in circuitry connected to subscriber line 14. In combined mode, wetting current unit 27 in the embodiment illustrated may be disabled as POTS or ISDN standards dictate applying a voltage to the subscriber line. In this case, in the combined mode when a splitter and corresponding POTS/ISDN equipment (e.g., voice switch 12 of FIG. 2) is present a constant DC voltage is supplied to subscriber line 14 by this unit. The wetting current thus generated in an embodiment is between 0.2 mA and 20 mA, while other embodiments may use other welting currents.

Furthermore, in the embodiment illustrated in FIG. 4, a DC measurement unit 28 is provided. With DC measurement unit 28, measurements which are also referred to as "metallic test access" or "line testing" can be performed, like measurements for determining whether a foreign voltage is connected to subscriber line 14, or measurements of capacitances coupled with subscriber line 14. Such measurements, in an arrangement having a splitter are conventionally implemented on the POTS/ISDN linecard 18. In order to be able to perform these measurements also in a splitterless environment like in FIG. 3, DC measurement unit 28 is provided in embodiments, such that the measurements can be performed irrespective of whether a splitter and the corresponding POTS/ISDN linecards are present or not.

In the following, a realization of Z measurement unit 22, 2/4 conversion unit 25, DC measurement unit 28 and wetting current unit 27 according to an embodiment is discussed with reference to FIG. 5.

Figure 5:
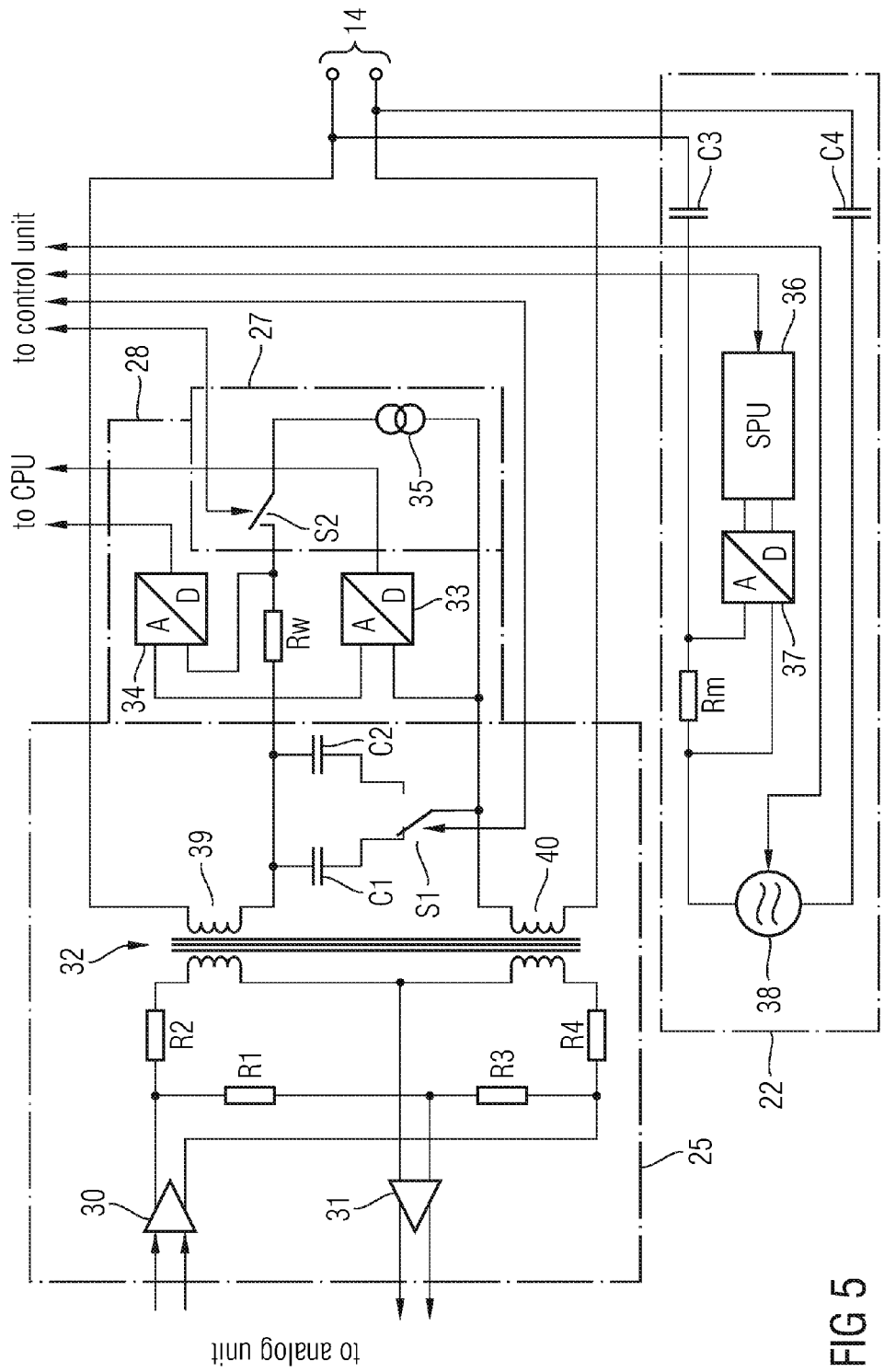
FIG. 5 is a circuit diagram illustrating circuitry according to an embodiment.

In the embodiment illustrated in FIG. 5, Z measurement unit 22 comprises a controllable AC voltage source 38, a measurement resistor Rm, an analog/digital converter 37 and a signal processing unit 36. Furthermore, coupling capacitors C3 and C4 are provided to couple Z measurement unit 22 to subscriber line 14. Capacitors C3 and C4 are dimensioned such as to allow the AC measurements with the frequencies as discussed below, but to basically block signals having a lower frequency or even DC signals. A current flowing via subscriber line 14 dependent on the voltage applied by AC voltage source 38 is measured by measuring the corresponding voltage drop over the measurement resistor Rm, converting it to a digital value using analog/digital converter 37 and calculating the impedance by dividing the applied voltage by the measured current in signal processing unit 36. To this end, when control unit 20 of FIG. 4 controls AC voltage source 38 to supply a certain voltage with a certain frequency, SPU 36 is informed by control unit 20 of these parameters so as to be able to perform the measurement and calculation.

An exemplary implementation of a measurement procedure for determining whether a splitter is present is explained in the following.

The method which is employed in one embodiment uses information based on the frequency dependence of a termination impedance (i.e., that the high-pass filter and the low-pass filter provided in a splitter having a defined frequency behavior and the POTS/ISDN linecard constitutes a defined termination having a defined impedance). In particular, as already discussed, high-pass filter 16 in a conventional realization of a splitter as illustrated in FIG. 2 may be a first order high-pass filter (e.g., formed by a capacitance) which therefore has a weak dependency of its attenuation on frequency. On the other hand, low-pass filter 15 conventionally may be a higher order filter (e.g., a sixth order filter) which therefore has a strong dependency of its attenuation on frequency and in particular has an almost abrupt change from passband to cut-off region. Therefore, for example in the case of POTS combined with DSL, when the corner frequency (which in the following is designated $f_1$) of low-pass filter 15 and high-pass filter 16 is 25 kHz, below $f_1$ DSL linecard 17 "sees" the impedance of POTS/ISDN linecard 18, whereas for frequencies higher than $f_1$ low-pass filter 15 is in the cut-off region and therefore DSL linecard 17 sees an open connection (i.e., a termination with a very high impedance). Therefore, the following measurement procedure for detecting the presence of a splitter may be employed:

1. Measure impedance at a frequency below $f_1$ (e.g., $f_1-df$), wherein for the case of $f_1=25$ kHz df may be 18 kHz and therefore the measurement frequency may be 7 kHz. This impedance will be designated Zlow.

2. Measure an impedance Zhigh at a frequency above $f_1$ (e.g., $f_1+df$) (in the numerical example given above 43 kHz).

3. If |Zhigh−Zlow|>dZ, wherein dZ is a given constant (e.g., 200Ω), then decide that a splitter is present 4. Else decide that a splitter is not present. .

Therefore, with only two easily implemented measurements the presence of a splitter can be detected.

In case of an ISDN system, $f_1$ would be set to 138 kHz (see FIG. 1). Moreover, according to another embodiment it is also possible to perform three impedance measurements, namely a measurement of Zlow below a first frequency $f_1$ (e.g., 25 kHz), of an impedance Zmid between said first frequency and a second frequency $f_2$ (e.g., $f_2$=138 kHz), and of Zhigh above the second frequency. In this case, if Zlow differs from Zmid by more than dZ, a POTS splitter and corresponding POTS linecard is present, if Zmid differs from Zhigh by more than dZ, a ISDN splitter and corresponding ISDN linecard is present, and if none of the two cases applies, no splitter is present.

In still further embodiments, a plurality of measurements are performed over a given frequency range, for example from 4 kHz to 200 kHz, to detect the presence of a splitter and its splitting frequency (i.e., the corner frequencies of its filter(s)). In embodiments, the splitting frequency thus determined is used for determining the frequency range to be used for data transmission (e.g., DSL communication).

In embodiments, the above-described measurements are performed by using sine signals at the frequencies to be measured. In other embodiments, multitone signals over a wider frequency range are used for obtaining a plurality of measurement values at different frequencies simultaneously.

As indicated in FIG. 5, Z measurement unit 22 is coupled with control unit 20 of FIG. 4 which, as already described, evaluates the results and performs the corresponding actions.

Next, the realization of 2/4 wire conversion unit 25 according to the embodiment illustrated in FIG. 5 is discussed. In the embodiment illustrated in FIG. 5, 2/4 wire conversion unit 25 comprises a transformer 32 for signal coupling. The 2/4 wire conversion itself takes place in the circuit part illustrated on the left side of 2/4 wire conversion unit 25 in FIG. 5 and is, in the embodiment illustrated, realized as a bridge circuit comprising resistors R1-R4 and the corresponding inductivities of transformer 32. An amplifier 30 amplifies the signals received from analog unit 24 of FIG. 4 which are then coupled into subscriber line 14 via transformer 32, and an amplifier 31 amplifies the signals received from subscriber line 14 which are to be forwarded to analog unit 24. In the embodiment illustrated, the resistances R1-R4 are provided to minimize reflecting of the sending signal (i.e., the signal received from analog unit 24) back to analog unit 24 via amplifier 31. To this end, one or more of resistors R1-R4 may be made adjustable. Additional means for echo cancellation (e.g., a corresponding filter) may also be provided.

On the side of transformer 32 to which subscriber line 14 is coupled, capacitors C1 and C2 are provided which selectively can be coupled between inductors 39, 40 of transformer 32 via switch S1. Switch S1, as indicated by an arrow in FIG. 5, is controlled by control unit 20. Capacitors C1 and C2, respectively, together with inductors 39 and 40 form a high-pass filter for signals received from and sent to subscriber line 14. Capacitors C1 and C2 in the embodiment illustrated have different values, such that by switching between C1 and C2 the corner frequency of this high-pass filter can be varied. In the embodiment illustrated, the corner frequency with capacitor C1 coupled between inductors 39 and 40 may, for example be 15 kHz while with C2 it may be 138 kHz. In this case, if a splitter with an ISDN linecard is detected or present, capacitor C2 is coupled between inductors 39 and 40 to provide DSL together with ISDN service, whereas in the absence of ISDN capacitor C1 is coupled between inductors 39 and 40 to be able to use the full bandwidth for DSL.

In a different embodiment, an additional capacitor is provided so as to able to switch between three possible corner frequencies, one for DSL alone (e.g., 15 kHz), one for DSL together with POTS (e.g., 25 kHz) and one for DSL together with ISDN (e.g., 138 kHz). In a further embodiment, the selectable frequencies may be 25 kHz and 138 kHz, the former being used for DSL together with POTS or DSL alone and the latter being used for DSL together with ISDN.

Wetting current unit 27 in the embodiment of FIG. 5 is realized by a current source 35 coupled to subscriber line 14 via a switch S2 as needed. Therefore, the wetting current does not necessarily flow the whole time, but may be fed to subscriber line 14 in intervals or only in single mode.

DC measurement unit 28 in the embodiment of FIG. 5 comprises an analog/digital converter 33 coupled between the two wires of subscriber line 14 for measuring a voltage applied on subscriber line 14 and a measurement resistor Rw to provide the voltage drop which is measured by analog/digital converter 34. Since the voltage drop over measurement resistor Rw corresponds to the current flowing multiplied with the resistance value of resistor Rw, analog/digital converter 34 measures the current flowing on subscriber line 14. The outputs of analog/digital converter 33 and 34 are coupled with central processing unit 21 of FIG. 4 for evaluation of the results.

DC measurement unit 28 as illustrated in FIG. 5 comprises one measurement resistor Rw located on one side of current source 35. In a different embodiment, two measurement resistors are provided, one on each side of current source 35, and each coupled with a corresponding analog/digital converter for measurement. In this way, imbalances in the subscriber line 14, for example an imbalance to ground, may be detected.

As a matter of course, the above-described embodiments are to be taken as examples only and not as limiting the scope of the present invention. Some of the possible modifications to the above-described embodiments are discussed in the following.

In the above-mentioned embodiments, a wetting current unit and a DC measurement unit are provided. However, in other embodiments these elements are not present. In such embodiments, the DC measurements for line testing if needed may be for example performed with separate dedicated test equipment which may be coupled to subscriber lines via relays or other means.

In FIG. 4 and to some extent also in FIG. 5, the various functions of the embodiment are represented by separate blocks. However, this does not mean that the various units or blocks have to be implemented as separate circuits but various blocks may be integrated together in one circuit or integrated circuit. Moreover, while in the embodiment of FIG. 4 a central processing unit and a control unit are illustrated as separate entities, the two functions may be combined in a single processing unit.

In the embodiments of FIGS. 4 and 5, Z measurement unit 22 is coupled to subscriber line 14. In a different embodiment, the functionality of Z measurement unit 22 is implemented in the part of the circuit responsible for the processing of the DSL signals (i.e., in analog unit 24 and digital unit 23 which, in an embodiment, form a DSL chipset). In this case, when evaluating the impedance measurement to determine whether a splitter is present, the attenuation of the high-pass filter of the 2/4 wire conversion unit which has been described above has to be taken into account. However, since the capacitance and inductance value forming that filter are known, this effect may be compensated by a corresponding evaluation process.

In the embodiment illustrated, the presence of a splitter is detected via impedance measurements. In other embodiments, the presence of a splitter may be determined by reflectometry measurements. In this case, a signal is sent via subscriber line 14 and basically the time until the reflected signal arrives back at the circuit is measured to determine a length of the line to a corresponding reflecting element. For a frequency smaller than $f_1$ ($f_1$ defined as explained above) the POTS/ISDN linecard connected to a splitter in case of FIG. 2 would constitute a reflecting element. Therefore, if for these frequencies a length of less than a given length (e.g., 100 m) result, this would be taken as an indication that a splitter is present. In this respect, it should be noted that the drawings are not to scale, and splitter 11 in FIG. 2 may be located remote from DSLAM 13 and voice switch 12, and also between voice switch 12 and DSLAM 12 there may be some distance.

Furthermore, as already explained, in different embodiments there is no automatic splitter detection, but the information in which mode to operate the system is given by an external control signal, for example dependent on a user input. On the other hand, the method and devices for determining whether a splitter which has been described above may also be employed separately, for example in testing equipment.

As has already been mentioned, besides the high-pass filter in the 2/4 wire conversion unit 25 (the corner frequency of which is switched by switch S1 in the embodiment of FIG. 5), further high-pass filters may be present in analog unit 24 or digital unit 23. The corner frequency of these additional filters may be switched as well, or the filters may be disabled entirely (i.e., corresponding to a corner frequency of 0) if the whole frequency range is to be used for DSL and/or if no other service is present.

In other embodiments, no switching of filters occurs, but the usable frequencies for DSL transmission are still changed from a first frequency range (e.g., above 138 kHz in case of combined DSL and ISDN use) to a second, broader frequency range like the whole frequency range (e.g., for DSL use alone). In such an embodiment, no switchable filters are needed. On the other hand, because of the attenuation of the filters for the corresponding combined mode or mode using the first frequency range, the use of the remaining frequency range is limited, (i.e., less additional data may be transmitted via the additional frequencies).

Furthermore, in embodiments a lightning protection for the DSL linecard is provided. The lightning protection in this embodiment is designed to work also in the case of no splitter being present (i.e., in the case of FIG. 3 where a lightning protection provided by high-pass filter 16 of splitter 11 of FIG. 2 is not available).

While the embodiments of the invention have been discussed using an exemplary DSL linecard, other embodiments may generally be employed in communication systems wherein signal transmission may be performed either over a wider frequency range or a narrower frequency range comprised in the wider frequency range.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of signal telecommunication, comprising:
receiving a selection signal;
selecting, with circuitry, a selected frequency range used for a signal telecommunication from a set of predetermined frequency ranges for signal telecommunication depending on the selection signal, wherein the set of predetermined frequency ranges comprises a first frequency range and a second frequency range comprising the first frequency range;
detecting whether a splitter device is connected to a communication line used for the signal telecommunication; and
forming the selection signal based on the result of the detection.

2. The method according to claim 1, wherein the selection signal is indicative of whether a communication line used for the signal telecommunication is fully available for the signal telecommunication or a frequency range is reserved for a further signal telecommunication on the communication line.

3. The method according to claim 2, wherein the further signal telecommunication comprises at least one of plain old telephone system (POTS) communication and integrated services digital network (ISDN) communication.

4. The method according to claim 1, wherein the signal telecommunication is a digital subscriber line (DSL) communication.

5. The method according to claim 1, wherein a lower corner frequency of the second frequency range is less than a lower corner frequency of the first frequency range.

6. The method according to claim 1, wherein a lower corner frequency of at least one frequency range of the set of predetermined frequency ranges is equal to or less than 15 kHz.

7. A method of signal telecommunication, comprising:
receiving a selection signal;
detecting whether a splitter for partitioning a frequency range useable on a communication line used for the signal telecommunication is present;
adjusting a corner frequency of a filter in a signal path for the signal telecommunication depending on the selection signal and the detecting; and
limiting, with the filter, a frequency range used for the signal telecommunication based on the corner frequency.

8. The method according to claim 7, wherein adjusting the corner frequency comprises:
switching the corner frequency to a frequency selected from a group comprising a first frequency between a frequency range used for voice communication and a frequency range used for data communication and a second frequency below the first frequency.

9. The method according to claim 8, wherein:
the detecting comprises detecting whether a splitter for partitioning a frequency range usable on a communication line used for the signal telecommunication between the voice communication and the data communication is present; and
adjusting the corner frequency comprises:
switching the corner frequency to the first frequency if a splitter is present; and
switching the corner frequency to the second frequency if no splitter is present.

10. The method according to claim 9, wherein the detecting comprises:
measuring an impedance of the communication line at least at a frequency above the first frequency and at a frequency below the first frequency.

11. The method according to claim 9, wherein the detecting comprises:
performing a reflectometry measurement with a frequency below the first frequency.

12. The method according to claim 7, wherein the filter is a high-pass filter on a digital subscriber line (DSL) linecard.

13. A circuit configured for signal telecommunication, the circuit comprising:
a connector configured to couple to a communication line for the signal telecommunication;
an adjustable filter having a switchable corner frequency; and
a control circuit coupled to the adjustable filter, the control circuit configured to detect whether a splitter is connected to the communication line and switch the corner frequency based on the detection to determine a frequency range for the signal telecommunication.

14. The circuit according to claim 13, wherein the corner frequency is a lower corner frequency of the frequency range.

15. The circuit according to claim 13, wherein the adjustable filter comprises:
a set of capacitors; and
a switch coupled to the set of capacitors, wherein the switch, depending on a state of the switch, is configured to connect one of the capacitors for determining the corner frequency.

16. The circuit according to claim 13, comprising:
a transformer coupled to the connector, wherein the adjustable filter is on a connector side of the transformer.

17. The circuit according to claim 13, comprising
an impedance meter coupled to the connector and to the control circuit.

18. The circuit according to claim 13, comprising:
at least one of a voltage meter and a current meter coupled to the connector.

19. The circuit according to claim 13, comprising:
a current source coupled to the connector.

20. The circuit according to claim 19, wherein the current source is switchably coupled to the connector.

21. The circuit according to claim 13, comprising:
digital subscriber line (DSL) signal processing circuitry.

22. The circuitry according to claim 13, wherein the switchable corner frequency is switchable between at least a first frequency allowing for voice communication in a further frequency range below the frequency range and a second frequency below the first frequency allowing usage of at least part of the further frequency range for the signal telecommunication.

23. A linecard comprising:
signal telecommunication circuitry, the circuitry comprising:
a connector configured to couple to a communication line for the signal telecommunication;
an adjustable filter having a switchable corner frequency; and
a control circuit coupled to the adjustable filter, the control circuit configured to detect whether a splitter is connected to the communication line and switch the corner frequency based on the detection to determine a frequency range for the signal telecommunication.

24. The line card according to claim 23, wherein the adjustable filter comprises:
a set of capacitors; and
a switch coupled to the set of capacitors, wherein the switch, depending on a state of the switch, is configured to connect one of the capacitors for determining the corner frequency.

25. The linecard according to claim 23, wherein the switchable corner frequency is switchable between at least a first frequency allowing for voice communication in a further frequency range below the frequency range and a second frequency below the first frequency allowing usage of at least part of the further frequency range for the signal communication.

26. A device for signal telecommunication, the device comprising:
means for detecting whether a splitter for partitioning a frequency range usable on a communication line used for the signal telecommunication is present; and
means for switching a corner frequency of a filter in a signal path for the signal telecommunication depending on a selection signal and the detecting, wherein the corner frequency limits a frequency range used for the signal telecommunication.

27. The device according to claim 26, wherein the means for switching comprises:
means for switching the corner frequency to a frequency selected from a set comprising a first frequency between a frequency range used for voice communication and a frequency range used for data communication and a second frequency below the first frequency.

28. The device according to claim 26, wherein:
the means for detecting detects whether a splitter for partitioning a frequency range usable on a communication line used for the signal telecommunication between a voice service and a data service is present; and
the means for switching the corner frequency switches the corner frequency to the first frequency if a splitter is present and switches the corner frequency to the second frequency if no splitter is present.

29. The device according to claim 26, wherein the means for detecting comprises: means for measuring an impedance of the communication line at a frequency above the first frequency and at a frequency below the first frequency.

30. The device according to claim 26, wherein the means for detecting comprises: means for performing a reflectometry measurement with a frequency below the first frequency.

31. A device configured to detect the presence of a splitter, wherein the splitter has a predetermined frequency to separate signals, the device comprising:
an impedance meter; and
a control circuit coupled to the impedance meter and configured to provide a measure of a first impedance on a communication line used for signal telecommunication at a first frequency below the predetermined frequency, provide a measure of a second impedance on the communication line at a second frequency above the predetermined frequency, provide information whether a splitter is present based on the first impedance and the second impedance, and adjust a corner frequency of a filter based on the information whether a splitter is present to determine a frequency range for the signal telecommunication.

32. The device according to claim 31, wherein the predetermined frequency is one of 25 kHz and 138 kHz.

33. The method according to claim 31, wherein the information indicates that a splitter is present if a difference between the first impedance and the second impedance is at least 200Ω.

* * * * *